United States Patent
Kuramitsu et al.

(10) Patent No.: US 11,237,346 B2
(45) Date of Patent: Feb. 1, 2022

(54) OPTICAL FIBER CABLE

(71) Applicant: Fujikura Ltd., Tokyo (JP)

(72) Inventors: Ryo Kuramitsu, Sakura (JP); Akira Namazue, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 16/835,819

(22) Filed: Mar. 31, 2020

(65) Prior Publication Data

US 2021/0302676 A1 Sep. 30, 2021

(51) Int. Cl.
*G02B 6/44* (2006.01)

(52) U.S. Cl.
CPC .......... *G02B 6/443* (2013.01); *G02B 6/4495* (2013.01)

(58) Field of Classification Search
CPC .................................................. G02B 6/4495
See application file for complete search history.

(56) References Cited

U.S. PATENT DOCUMENTS

| | | | | |
|---|---|---|---|---|
| 4,422,718 A * | 12/1983 | Nakagome | ........... | G02B 6/4427 174/70 R |
| 6,178,278 B1 * | 1/2001 | Keller | ................. | G02B 6/4436 385/109 |
| 6,487,347 B2 * | 11/2002 | Bringuier | ............... | G02B 6/441 385/113 |
| 6,553,167 B2 * | 4/2003 | Hurley | ................. | G02B 6/4432 385/102 |
| 6,704,482 B2 * | 3/2004 | Okada | ................. | G02B 6/4495 385/111 |
| 6,760,522 B2 * | 7/2004 | Okada | ................. | G02B 6/4495 385/109 |
| 7,664,354 B2 * | 2/2010 | Keller | ................. | G02B 6/4494 385/109 |
| 9,594,226 B2 * | 3/2017 | Blazer | .................... | G02B 6/443 |
| 2008/0289851 A1 * | 11/2008 | Varkey | ................. | G02B 6/4416 174/115 |
| 2019/0154934 A1 * | 5/2019 | Cheng | ................. | G02B 6/4495 |
| 2021/0302676 A1 * | 9/2021 | Kuramitsu | ........... | G02B 6/4495 |

* cited by examiner

*Primary Examiner* — Rhonda S Peace (74) *Attorney, Agent, or Firm* — Osha Bergman Watanabe & Burton LLP (57) ABSTRACT

An optical fiber cable includes a core that includes optical fibers, a sheath that accommodates the core, and an interposed layer disposed between the core and the sheath. The interposed layer includes sheet materials arranged in a circumferential direction of the optical fiber to cover the core. Each of the sheet materials includes fibers solidified by a matrix.

20 Claims, 8 Drawing Sheets

OPTICAL FIBER CABLE

TECHNICAL FIELD

The present invention relates to an optical fiber cable.

BACKGROUND

Japanese Unexamined Patent Application, First Publication No. 2013-228647 discloses an optical fiber cable provided with a buffer layer on the outer periphery of a core in which a plurality of optical fibers are bundled in order to reliably protect the internal optical fibers from external force or the like. The buffer layer is wound around the outer periphery of the core of the optical fiber such that the edges of the tape-shaped member are in contact with each other. A holding binder is wound around the outer periphery of the tape-shaped member to fix the tape-shaped member wound in a cylindrical shape.

Incidentally, in such an optical fiber cable, when accessing to the optical fiber inside the buffer layer in the mid-span access operation or the like, an operation of cutting the holding binder, spreading the tape-shaped member, and accessing to the optical fiber is required. Therefore, the operation time of the mid-span access operation may be increased.

As described above, this type of optical fiber cable is required to have a configuration for protecting an optical fiber, and be able to easily access to an optical fiber disposed inside of the optical fiber cable.

SUMMARY

Embodiments of the present invention provide an optical fiber cable capable of easily accessing to an internal optical fiber while having a configuration for protecting the optical fiber.

An optical fiber cable according to one or more embodiments of the present invention includes a core having a plurality of optical fibers; a sheath that accommodates the core; and an interposed layer disposed between the core and the sheath, in which the interposed layer has a plurality of sheet materials arranged in a circumferential direction so as to cover the core, and each of the plurality of sheet materials includes fibers solidified by a matrix.

According to one or more embodiments of the present invention, it is possible to provide an optical fiber cable which has a configuration for protecting an optical fiber, and can easily access to an optical fiber disposed inside of the optical fiber cable.

DETAILED DESCRIPTION

The configuration of an optical fiber cable according to one or more embodiments will be described below with reference to FIG. 1A.

Figure 1A:
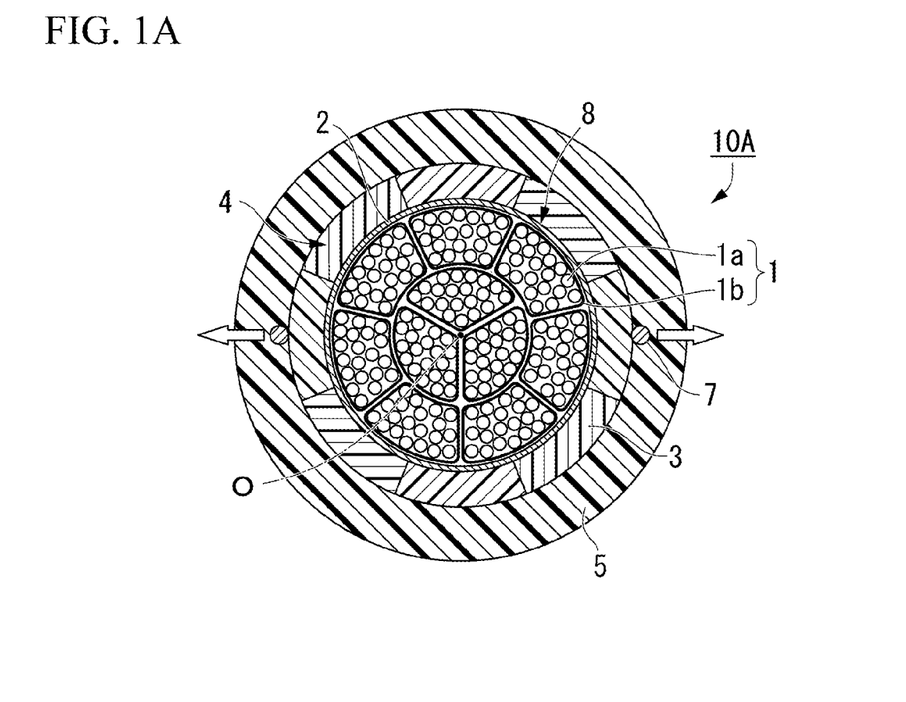
FIG. 1A is a transverse cross-sectional view showing the structure of an optical fiber cable according to one or more embodiments.

As shown in FIG. 1A, an optical fiber cable 10A of one or more embodiments includes a core 8 having a plurality of optical fibers 1a, an interposed layer 4, a sheath 5 provided outside the interposed layer 4, and a pair of ripcords 7 embedded in the sheath 5.

Here, in one or more embodiments, the sheath 5 is formed in a cylindrical shape having a common central axis O.

In one or more embodiments, a direction along the central axis O is called a longitudinal direction, and a cross section orthogonal to the longitudinal direction is called a transverse cross section. Further, in the transverse cross-sectional view, a direction intersecting the central axis O is referred to as a radial direction, and a direction revolving around the central axis O is referred to as a circumferential direction. The case where the optical fiber cable 10A or its constituent members are viewed from the outside in the radial direction is called side view.

The core 8 includes a plurality of optical fiber units 1 each having a plurality of optical fibers 1a, and a wrapping tube 2 wrapping these optical fiber units 1. The plurality of optical fiber units 1 are twisted in an SZ shape or a spiral shape, and wrapped by the wrapping tube 2. In addition, the core 8 may be configured by wrapping one optical fiber unit 1 with the wrapping tube 2.

Figure 8:
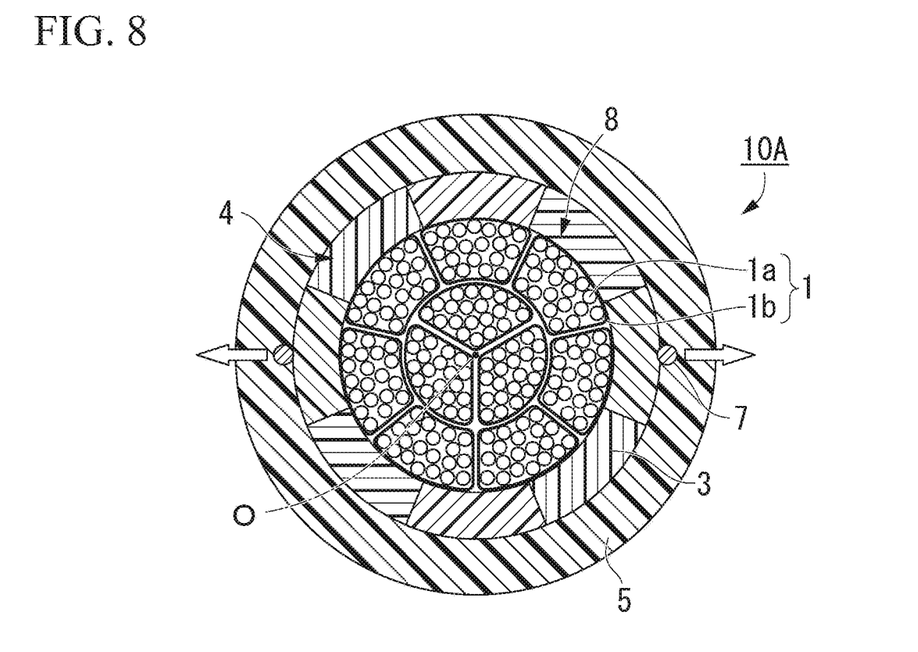
FIG. 8 is a transverse cross-sectional view showing the structure of an optical fiber cable according to one or more embodiments.

As the wrapping tube 2, a nonwoven fabric, a polyester tape, or the like can be used. Further, as the wrapping tube 2, a water-absorbing tape obtained by imparting water-absorbing property to a nonwoven fabric, a polyester tape, or the like may be used. In this case, the waterproof performance of the optical fiber cable 10A can be improved. It should be noted that the core 8 may not be provided with the wrapping tube 2 as shown in FIG. 8. However, when the wrapping tube 2 is provided, since the optical fiber unit 1 is wrapped by the wrapping tube 2, the optical fiber 1a can be more protected from external force.

The optical fiber unit 1 of one or more embodiments includes a plurality of optical fibers 1a and a binding material 1b that bundles the optical fibers 1a. As the optical fiber 1a, an optical fiber core wire, an optical fiber strand, an optical fiber ribbon, or the like can be used. As one type of optical fiber ribbon, the plurality of optical fibers 1a may form a so-called intermittently-fixed ribbon. In the intermittently-fixed ribbon, when the plurality of optical fibers 1a are pulled in a direction orthogonal to the extending direction thereof, the optical fibers are adhered to each other so as to spread in a mesh shape (spider web shape). Specifically, one optical fiber 1a is adhered to adjacent optical fibers 1a on both sides thereof at different positions in the longitudinal direction, and the adjacent optical fibers 1a are adhered to each other at a fixed interval in the longitudinal direction.

In addition, the aspect of the optical fiber 1a included in the core 8 is not limited to the intermittently-fixed ribbon, and may be appropriately changed.

The binding material 1b may be in a string shape, a sheet shape, or a tube shape. Further, the plurality of optical fibers 1a may be wrapped by the wrapping tube 2 without being bundled (that is, without constituting the optical fiber unit 1). Alternatively, the plurality of optical fibers 1a may be bundled by being twisted together to form the optical fiber unit 1. In this case, the optical fiber unit 1 may not have the binding material 1b.

In FIG. 1A and the like, the cross-sectional shape of the optical fiber unit 1 is arranged, but the cross-sectional shape may collapse due to the movement of the optical fiber 1a in the optical fiber unit 1. In FIG. 1A and the like, three optical fiber units 1 form an inner layer, and seven optical fiber units 1 form an outer layer. However, a part of the outer layer may enter the inner layer. Alternatively, the optical fiber units 1 may not form these layers.

Further, in FIG. 1A and the like, the plurality of optical fiber units 1 are arranged with uniform gaps, but there may be no gaps or the gaps may be uneven. Alternatively, a filling may be inserted between the optical fiber units 1 so as to adjust the installing density of the optical fibers 1a on the core 8 and arrange the shape of the core 8.

The interposed layer 4 is located between the core 8 and the sheath 5 and has a plurality of sheet materials 3. The plurality of sheet materials 3 extend linearly along the longitudinal direction, and are disposed so as to cover the entire circumference of the core 8. The interposed layer 4 of one or more embodiments has a single-layer structure in which each of the plurality of sheet materials 3 is disposed so as to be at least partially in contact with the core 8. The "single-layer structure" includes a case where the sheet materials 3 do not overlap in the radial direction as shown in FIG. 1A. In addition, the "single-layer structure" includes the other case where, for example, only end parts of some or all of the sheet materials 3 in the circumferential direction overlap in the radial direction as shown in FIG. 1D.

As shown in FIG. 1A, each sheet material 3 is curved in an arc shape along a curved surface on the outer periphery of the core 8. In the example shown in FIG. 1A, the end parts of the sheet materials 3 in the circumferential direction are in contact with each other, and the entire circumference of the core 8 is covered with the eight sheet materials 3. For example, in an optical fiber cable having 288 optical fibers 1a, eight sheet materials 3 having a thickness of 0.4 to 0.5 mm in a radial direction and a width of 3.5 mm in a circumferential direction are used. The number and dimensions of the sheet material 3 used for the optical fiber cable 10A are not limited to this example, and may be appropriately changed according to the outer diameter of the core 8 and the characteristics required for the interposed layer 4.

The ripcord 7 is a thread of a synthetic fiber such as polyester or the like, and is used to tear the sheath 5. Further, as the ripcord 7, a cylindrical rod made of polypropylene (PP) or nylon may be used. The pair of ripcords 7 are disposed so as to sandwich the core 8 therebetween in the radial direction. The number of the ripcords 7 embedded in the sheath 5 may be one or three or more.

In the example shown in FIG. 1A, each ripcord 7 is disposed radially outside one sheet material 3. Not limited to this example, each ripcord 7 may be disposed so as to contact two sheet materials 3.

The sheath 5 covers the core 8, the plurality of sheet materials 3, and the ripcord 7. As the material of the sheath 5, polyolefin (PO) resins such as polyethylene (PE), polypropylene (PP), ethylene ethyl acrylate copolymer (EEA), ethylene vinyl acetate copolymer (EVA), and ethylene propylene copolymer (EP), polyvinyl chloride (PVC), or the like can be used. Further, a mixture (alloy, mixture) of the above resins may be used.

A mark for indicating the position of the ripcord 7 may be provided on the outer peripheral surface of the sheath 5. The mark may be a marking made of paint, a protrusion protruding radially outward, or a groove recessed radially inward. These marks may extend along the longitudinal direction.

Note that the material forming the sheath 5 may include capsaicin and the like. In this case, it is possible to prevent an animal such as a rat from biting the sheath 5.

<Configuration of Sheet Material 3>

Figure 1B:
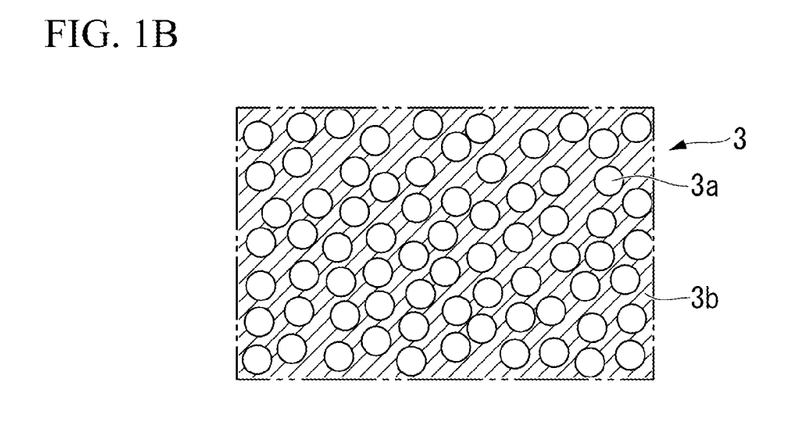
FIG. 1B is an enlarged view showing an example of the structure of a sheet material of FIG. 1A.

The sheet material 3 includes, for example, as shown in FIG. 1B, fibers 3a solidified by a matrix 3b. As the fiber 3a used for the sheet material 3, glass fiber, aramid fiber, carbon fiber, metal fiber (for example, iron fiber, stainless steel fiber) or the like can be used. Since these fibers 3a have high tensile strength, the fibers 3a are suitable when the sheet material 3 is used as a tension member. As the matrix 3b for fixing the fibers 3a, a thermosetting resin such as an epoxy resin, a thermoplastic resin, an ultraviolet curable resin, an elastomer (rubber), or the like can be used. The sheet material 3 may be a so-called fiber reinforced plastic (FRP).

The type of the fiber 3a can be selected according to the characteristics required for the optical fiber cable 10A.

For example, since glass fiber has an insulating property, a configuration for grounding is not required. Further, the unit price is lower than that of aramid fiber. On the other hand, compared to other materials (fibers), the tensile strength is lower. Further, since the amount of contraction of the glass fiber at a low temperature is small, the contraction of the sheet material 3 in a low-temperature environment can be reduced. Therefore, the stress applied to the optical fiber 1a due to the contraction of the sheet material 3 can be reduced.

Since the aramid fiber has an insulating property, a configuration for grounding is not required. It also has higher tensile strength compared to glass fibers. On the other hand, for example, when the sheath 5 tends to contract in a low temperature environment, the ability of the aramid fiber to suppress the contraction deformation is relatively low, and the optical fiber 1a is likely to be affected. Further, the unit price is higher than that of glass fiber.

Since carbon fibers have high tensile strength, the carbon fibers are more suitable when the sheet material 3 is used as a tension member. On the other hand, since the unit price is high and has conductivity, a configuration for grounding the sheet material 3 may be required.

To form the sheet material 3, the fibers 3a are soaked in the matrix 3b while keeping the directionality (orientation) of the fibers 3a, and then the matrix 3b is cured. In this case, the sheet material 3 becomes resistant to tension in the extending direction of the fibers 3a (fiber direction). By disposing the sheet material 3 such that the fiber direction of the sheet material 3 coincides with the longitudinal direction of the optical fiber cable 10A, the sheet material 3 can be used as a tension member of the optical fiber cable 10A. The tensile strength of the sheet material 3 can be adjusted, for example, by changing the type and amount of the fibers 3a of the sheet material 3 and changing the cross-sectional area of the sheet material 3.

In an optical fiber cable in the related art, for example, a metal wire (such as a steel wire) or an FRP rod is used as a tension member, and these tension members are embedded in a sheath covering a core. On the other hand, the optical fiber cable 10A of one or more embodiments shown in FIG. 1A uses a plurality of sheet materials 3 formed of fiber reinforced plastic as a tension member, and therefore does not include a tension member other than the plurality of sheet materials 3.

Accordingly, even when the optical fiber cable 10A does not include a tension member other than the sheet material 3, the optical fiber 1a can be protected from tension when the optical fiber cable 10A is pulled in the longitudinal direction. Further, since there is no need to dispose a tension member other than the sheet material 3, the weight and diameter of the optical fiber cable 10A can be reduced. Furthermore, in cross-sectional view, since the sheet material 3 which is a tension member is uniformly disposed over the entire circumference of the optical fiber cable 10A, the flexibility of the optical fiber cable 10A is not directional and is easily bent in any direction. Therefore, workability at the time of installing the optical fiber cable 10A can be improved.

The optical fiber cable 10A may include a tension member other than the plurality of sheet materials 3. Further, the sheet material 3 may be a resin obtained by fixing a fiber layer in which fibers 3a are woven by a matrix 3b.

Further, the sheet material 3 has high strength against an external force to tear along the direction orthogonal to the fiber direction. Therefore, the optical fiber 1a can be protected from external force by the sheet material 3.

For example, optical fiber cables that are built, laid, or buried in a mountain or a forest may be bitten by wild animals such as mice, squirrels, and woodpeckers (biting injury), so an optical fiber inside the cable may be damaged. In the optical fiber cable 10A of one or more embodiments, the end parts in the radial direction of the sheet materials 3 are in contact with each other, and the core 8 is covered with the sheet materials 3 without any gaps. Thereby, the optical fiber 1a can be reliably protected from biting injury.

<Method of Taking Out Core 8 from Optical Fiber Cable 10A>

Figure 1C:
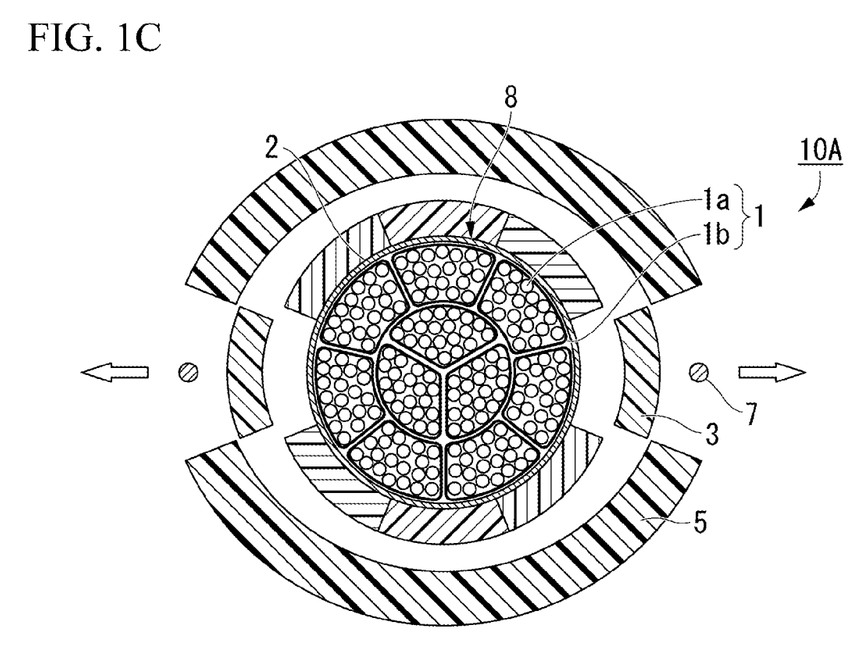
FIG. 1C is a transverse cross-sectional view of the optical fiber cable of FIG. 1A after the sheath has been torn along a longitudinal direction.
Figure 1D:
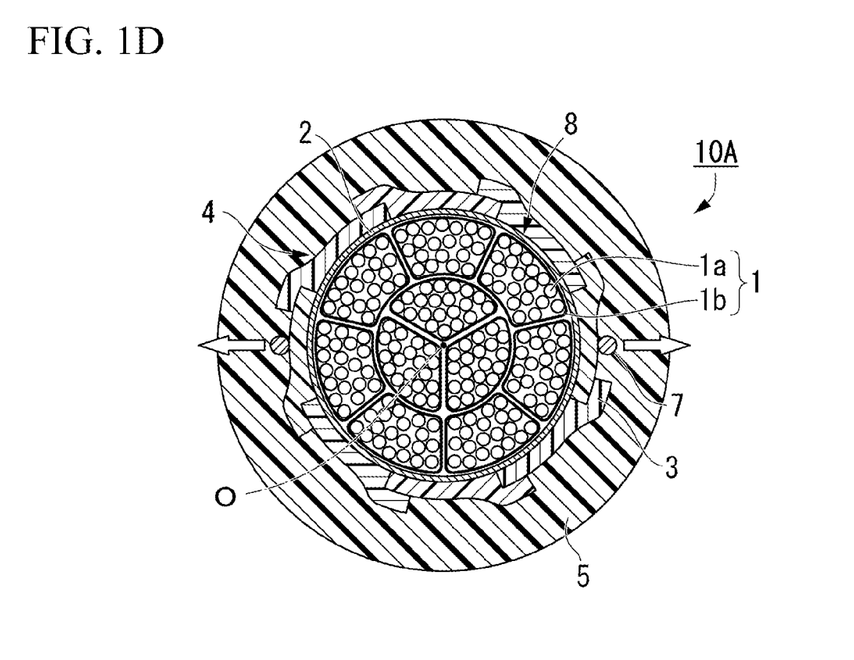
FIG. 1D is a transverse cross-sectional view showing the structure of an optical fiber cable according to one or more embodiments.

First, using a tool such as an electric knife, a part of the sheath 5 is stripped off to expose a part of the ripcord 7. The exposed ripcord 7 is pulled in the direction of the arrow shown in FIG. 1A, and the sheath 5 is torn along the longitudinal direction. Thereby, as shown in FIG. 1C, the sheath 5 is divided into two parts in the circumferential direction, and the sheet materials 3 are separated from the outer periphery of the core 8, so that the core 8 can be taken out.

In the access operation of the optical fiber cable 10A, an operation of taking out the core 8 from the optical fiber cable 10A, and accessing to the target optical fiber from the inside of the core 8 is performed. In order to perform the access operation more smoothly, it is necessary to reduce the labor for removing the sheath 5 and the sheet material 3 disposed outside the core 8.

Compared with an optical fiber cable in the related art having a buffer layer and a holding binder wound around a core, the optical fiber cable 10A of one or more embodiments does not require an operation of removing the wound buffer layer and the holding binder. Therefore, the access operation of the optical fiber cable 10A can be performed more smoothly.

(Method for Manufacturing Optical Fiber Cable)

The optical fiber cable according to one or more embodiments can be manufactured by a manufacturing method as shown in FIGS. 2A to 2D, for example.

Figure 2A:
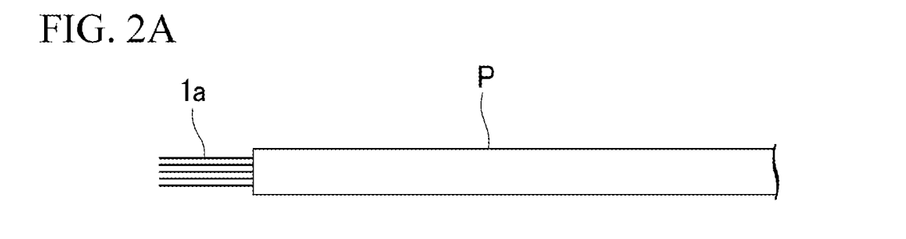
FIG. 2A is a view showing a method for manufacturing the optical fiber cable according to one or more embodiments.

First, as shown in FIG. 2A, a plurality of optical fibers 1a enter into a cylindrical pipe P (entry step). As the pipe P, a material having a higher melting point than the sheet material 3 and the sheath 5 and having high heat resistance can be suitably used. The shape of the pipe P may be cylindrical, square tubular, elliptical tubular, or the like. The optical fibers 1a that enter the pipe P may be in a state of being bundled by the binding material 1b, or may be in a state of being wrapped by the wrapping tube 2. That is, in the entry step, the plurality of optical fibers 1a in the state of the optical fiber unit 1 or the core 8 may be entered into the pipe P.

Figure 2B:
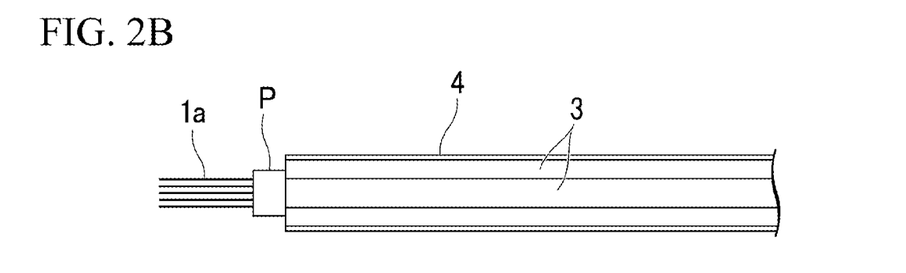
FIG. 2B is a view showing a step following FIG. 2A.

Next, as shown in FIG. 2B, a plurality of sheet materials 3 to be the interposed layer 4 are disposed around the pipe P in the circumferential direction so as to surround the optical fibers 1a (arrangement step). Thereby, the cylindrical interposed layer 4 having the same shape as the pipe P is formed. At this time, the sheet material 3 may be disposed such that the fiber direction in which the fiber 3a extends are parallel with the longitudinal direction in which the optical fiber 1a extends.

Figure 2C:
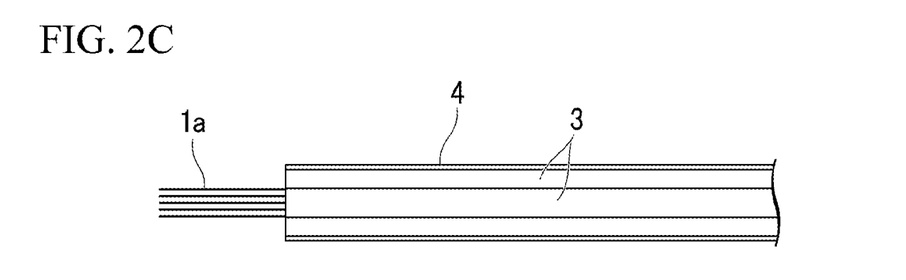
FIG. 2C is a view showing a step following FIG. 2B.

Next, the plurality of optical fibers 1a pass through the pipe P while being surrounded by the interposed layer 4 (passing step). At this time, the plurality of sheet materials 3 are moved on the outer peripheral surface of the pipe P in accordance with the speed (linear speed) at which the optical fiber 1a passes through the pipe P. This results in a state as shown in FIG. 2C.

Figure 2D:
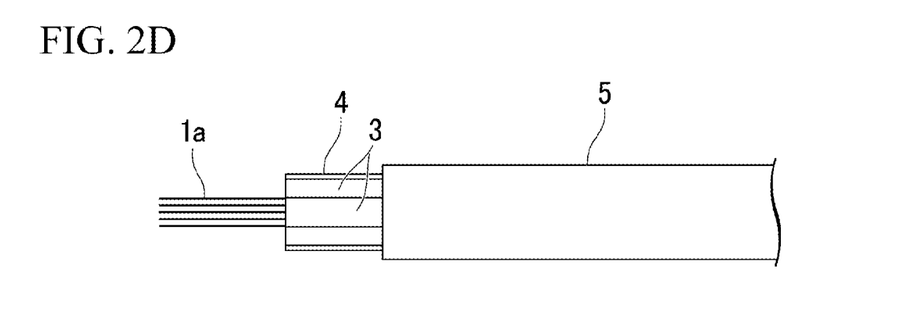
FIG. 2D is a view showing a step following FIG. 2C.

Next, as shown in FIG. 2D, a sheath 5 that covers the interposed layer 4 is formed (covering step). For example, the sheath 5 is formed around the interposed layer 4 by extrusion molding. Thereby, the optical fiber cable 10A is obtained.

According to the above-described manufacturing method, the interposed layer 4 in which the plurality of sheet materials 3 are disposed in the circumferential direction so as to surround the core 8 can be formed stably.

The method of manufacturing the optical fiber cable 10A is not limited to the above. For example, a plurality of sheet materials 3 which are the interposed layers 4 may be directly disposed around the core 8 without using the pipe P.

As described above, the optical fiber cable 10A according to one or more embodiments includes a core 8 having a plurality of optical fibers 1a, a sheath 5 accommodating the core 8, and an interposed layer 4 disposed between the core 8 and the sheath 5. The interposed layer 4 includes a plurality of sheet materials 3 arranged in a circumferential direction so as to cover the core 8, and each of the plurality of sheet materials 3 includes fibers 3a solidified by a matrix 3b.

According to the optical fiber cable 10A according to one or more embodiments, since the plurality of sheet materials 3 have high strength against external force, the optical fiber 1a can be protected from external force.

Further, during the taking-out-operation of the core 8, when the sheath 5 is removed, each sheet material 3 is separated from the outer periphery of the core 8, so that the operation of taking out the core 8 can be performed smoothly.

Furthermore, if the sheet material 3 is used as a tension member, there is no need to dispose a tension member other than the sheet material 3, so that the weight and diameter of the optical fiber cable 10A can be reduced. In addition, since the plurality of sheet materials 3 serving as tension members are disposed so as to cover the core 8, the optical fiber cable 10A can be easily bent in any direction, and workability when installing the optical fiber cable 10A can be further improved.

Further, since the interposed layer 4 has a single-layer structure in which each of the plurality of sheet materials 3 is at least partially in contact with the core 8, the diameter of the optical fiber cable 10A can be further reduced.

Further, in at least a part of adjacent sheet materials 3 among the plurality of sheet materials 3, end parts of the adjacent sheet materials 3 in the circumferential direction may abut each other. Since the core 8 is covered with the sheet material 3 without any gaps, the optical fiber 1a can be more reliably protected from external force.

Further, the sheet material 3 may extend linearly along the longitudinal direction. With this configuration, when the sheath 5 is removed during the taking-out-operation of the core 8, the plurality of sheet materials 3 are separated from the outer periphery of the core 8, so that the access operation of the optical fiber cable 10A can be performed more smoothly.

Next, other embodiments of the present invention will be described, but the basic configuration is the same as that of the above-described embodiments. Therefore, the same reference numerals are given to similar configurations, the explanation thereof will be omitted, and only differences will be described.

Figure 3A:
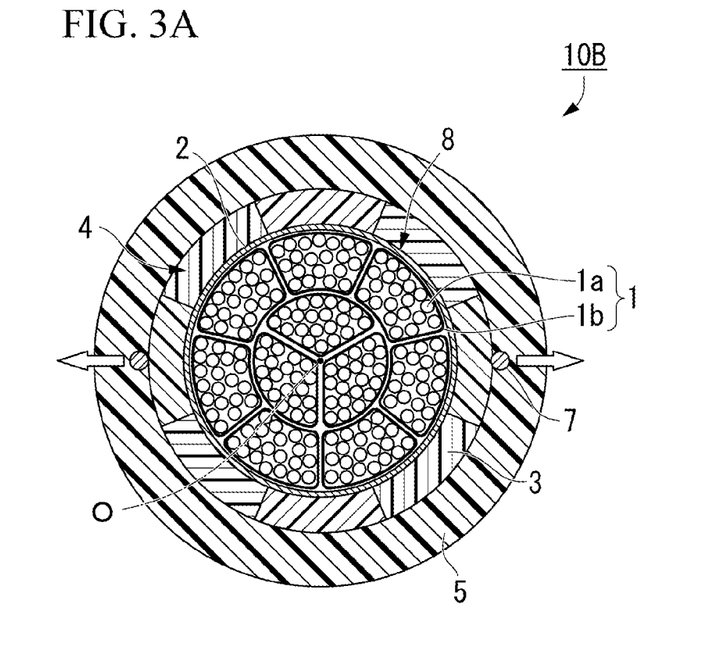
FIG. 3A is a transverse cross-sectional view showing the structure of an optical fiber cable according to one or more embodiments.

FIG. 3A shows an optical fiber cable 10B according to one or more embodiments.

The optical fiber cable 10B of FIG. 3A is different from the optical fiber cable 10A of FIG. 1A in that the ripcord 7 is fixed to at least one of the plurality of sheet materials 3. In the example of FIG. 3A, two ripcords 7 are fixed to radially outer side surfaces of the two sheet materials 3, respectively. The ripcord 7 is not fixed to the other six sheet materials 3. In order to fix the ripcord 7 to the sheet material 3, for example, the matrix 3b of the sheet material 3 may be melted and the ripcord 7 may be fused. The ripcord 7 may be adhered to the sheet material 3 with an adhesive applied to the outer periphery of the ripcord 7, or may be fixed by burying a part of the ripcord 7 in the sheet material 3.

Figure 3B:
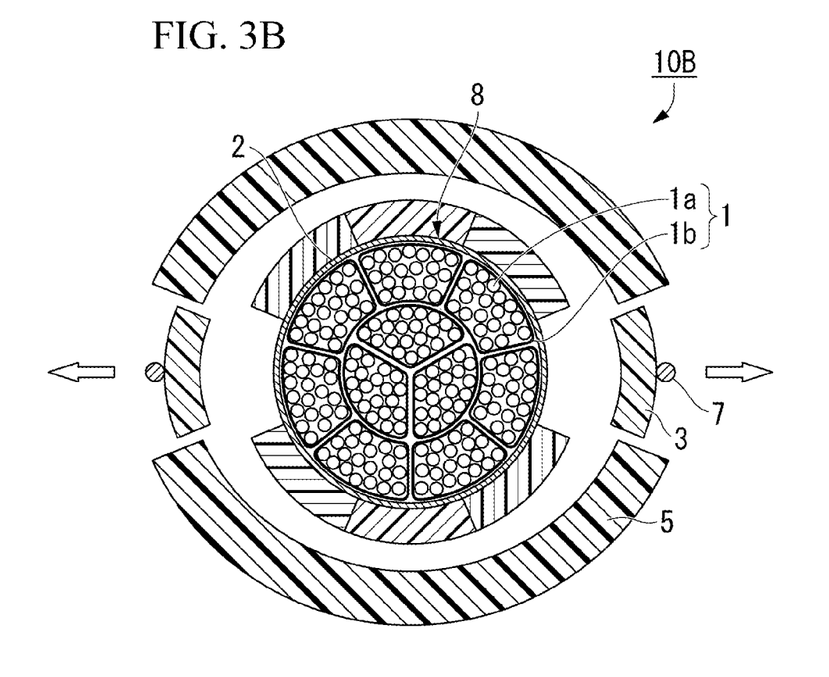
FIG. 3B is a transverse cross-sectional view of the optical fiber cable of FIG. 3A after the sheath has been torn along a longitudinal direction.

In the optical fiber cable 10B, when the sheath 5 is torn along the longitudinal direction by the ripcord 7, the sheet material 3 fixed to the ripcord 7 can be removed together with the ripcord 7 as shown in FIG. 3B.

As described above, in the operation of taking out the core 8, the labor for removing the sheet material 3 can be further reduced. Thereby, the taking-out-operation of the core 8 can be performed more smoothly.

Further, when the ripcord 7 is pulled to tear the sheath 5, it is possible to prevent a phenomenon that the ripcord 7 is not fixed in the sheath 5 and is pulled out (or come out) from the cable.

Next, other embodiments of the present invention will be described, but the basic configuration is the same as that of the above-described embodiments. Therefore, the same reference numerals are given to similar configurations, the explanation thereof will be omitted, and only differences will be described.

Figure 4A:
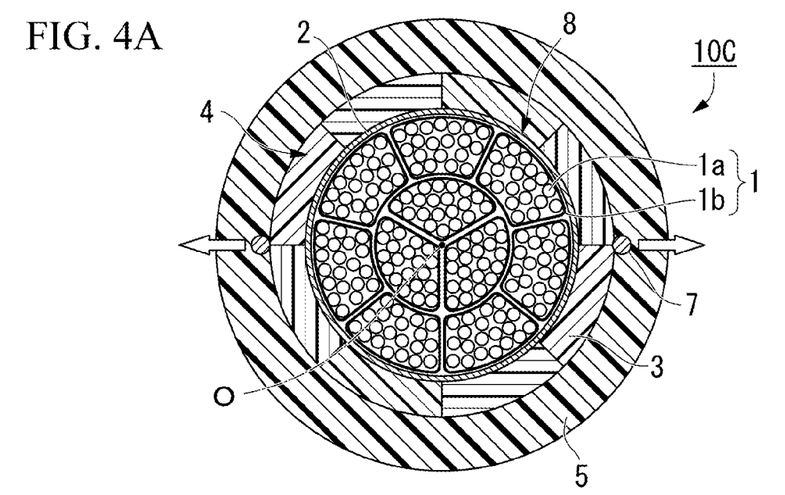
FIG. 4A is a transverse cross-sectional view showing the structure of an optical fiber cable according to one or more embodiments.

FIG. 4A shows an optical fiber cable 10C according to one or more embodiments.

Figure 4B:
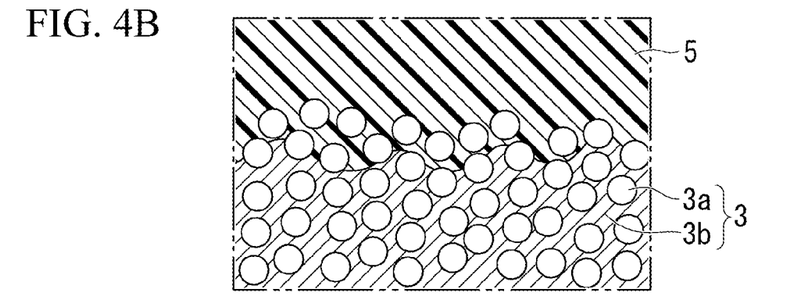
FIG. 4B is a schematic view of an interface between a sheath and a sheet material of the optical fiber cable of FIG. 4A.

The optical fiber cable 10C of FIG. 4A is different from the optical fiber cable 10A of FIG. 1A in that the radially outer side surfaces of the plurality of sheet materials 3 are fixed to the sheath 5. The ripcord 7 covers the boundary between the sheet materials 3 adjacent to each other in the circumferential direction from the radially outside. The plurality of sheet materials 3 and the sheath 5 may be fixed by permeating a part of the sheet material 3 with a constituent material (resin or the like) of the sheath 5 as shown in FIG. 4B, for example. In this case, the constituent material of the sheath 5 enters between the fibers 3a near the surface of the sheet material 3, and the fibers 3a are buried in the matrix 3b in other portions. Alternatively, the matrix 3b of the sheet material 3 may be melted and fused to the sheath 5. In this case, at the boundary between the sheet material 3 and the sheath 5, the constituent materials of the matrix 3b and the sheath 5 may be mixed.

Figure 4C:
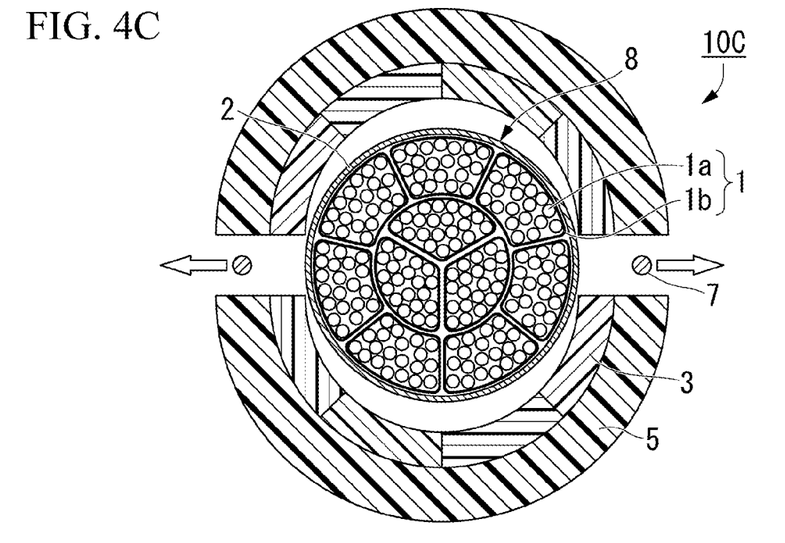
FIG. 4C is a transverse cross-sectional view of the optical fiber cable of FIG. 4A after the sheath has been torn along a longitudinal direction.

In the optical fiber cable 10C, since the plurality of sheet materials 3 are fixed to the sheath 5, when the sheath 5 is torn along the longitudinal direction by the ripcord 7, as shown in FIG. 4C, the sheath 5 and the plurality of sheet materials 3 fixed to the sheath 5 can be removed.

As described above, the labor for removing the sheet material 3 at the time of the taking-out-operation of the core 8 can be further reduced. Thereby, the taking-out-operation of the core 8 can be performed more smoothly.

Further, since the plurality of sheet materials 3 which are the tension members are fixed to the sheath 5, for example, contraction and expansion in the longitudinal direction of the sheath 5 when the temperature changes can be suppressed. Further, when the optical fiber cable 10C is pulled in the longitudinal direction, it is possible to prevent the sheath 5 from being excessively elongated. Thereby, it is possible to prevent a micro bending or tensile strain from being applied to the optical fiber 1a disposed inside the sheath 5.

Next, other embodiments of the present invention will be described, but the basic configuration is the same as that of the above-described embodiments. Therefore, the same reference numerals are given to similar configurations, an explanation thereof will be omitted, and only differences will be described.

Figure 5A:
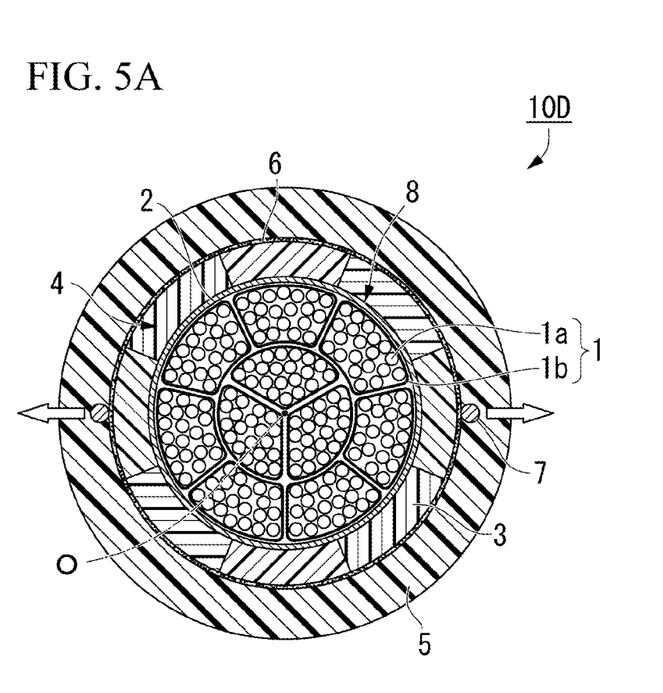
FIG. 5A is a transverse cross-sectional view showing the structure of an optical fiber cable according to one or more embodiments.

FIG. 5A shows an optical fiber cable 10D according to one or more embodiments.

The optical fiber cable 10D of FIG. 5A is different from the optical fiber cable 10A of FIG. 1A in that a plurality of sheet materials 3 are fixed to each other. The plurality of sheet materials 3 are adhered to each other with an adhesive 6, for example, as shown in FIG. 5A. The adhesive 6 is, for example, a thermosetting resin. In the example of FIG. 5A, the adhesive 6 covers the entire outer peripheral surface of the interposed layer 4.

Figure 5B:
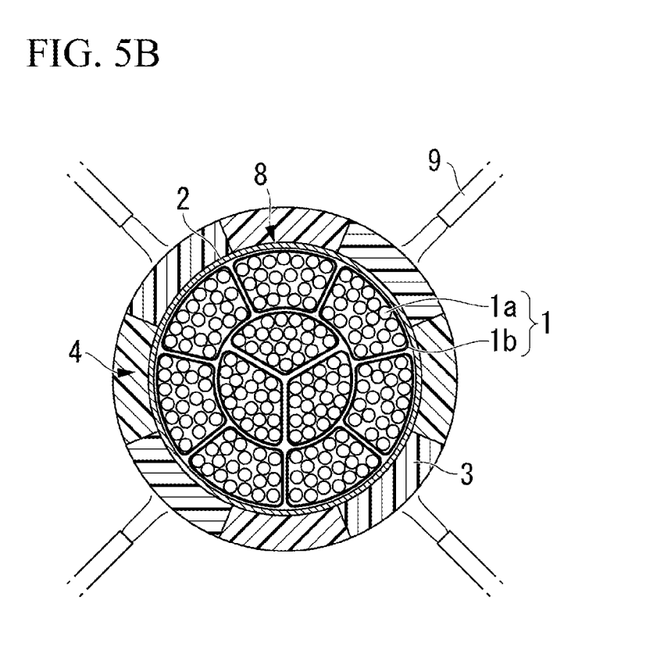
FIG. 5B is a schematic view showing a step of fixing a plurality of sheet materials to each other, in a manufacturing step of the optical fiber cable according to one or more embodiments.

As a method for manufacturing the optical fiber cable 10D of one or more embodiments, for example, after the arrangement step described in the above-described embodiments, as shown in FIG. 5B, the sheet material 3 may be heated by a heating device 9, and the matrices 3b on the surfaces of the sheet materials 3 may be melted and fused together (heating step). Alternatively, after the arrangement step described in the above embodiments, an adhesive 6 made of a thermosetting resin may be applied, and the adhesive 6 may be cured by heating.

The heating device 9 shown in FIG. 5B may be any device that can heat at least the surface of the sheet material 3. As a specific example of the heating device 9, a heated metal die, a heating furnace, or the like can be employed in addition to a rod-shaped heater as shown in FIG. 5B. When the temperature at the time of extrusion molding of the sheath 5 is higher than the melting point of the matrix 3b, the matrices 3b of the sheet materials 3 may be melted and fused to each other by heat at the time when the sheath 5 is extruded to the outer periphery of the interposed layer 4 and molded. In this case, the heating step and the covering step can be performed simultaneously.

In one or more embodiments, since the plurality of sheet materials 3 are fixed to each other, the core 8 can be more reliably covered with the sheet materials 3 without gaps. Thereby, the optical fiber 1a can be more reliably protected from external force.

It should be noted that the technical scope of the present invention is not limited to the above-described embodiments, and various modifications can be made without departing from the spirit of the present invention.

Figure 6:
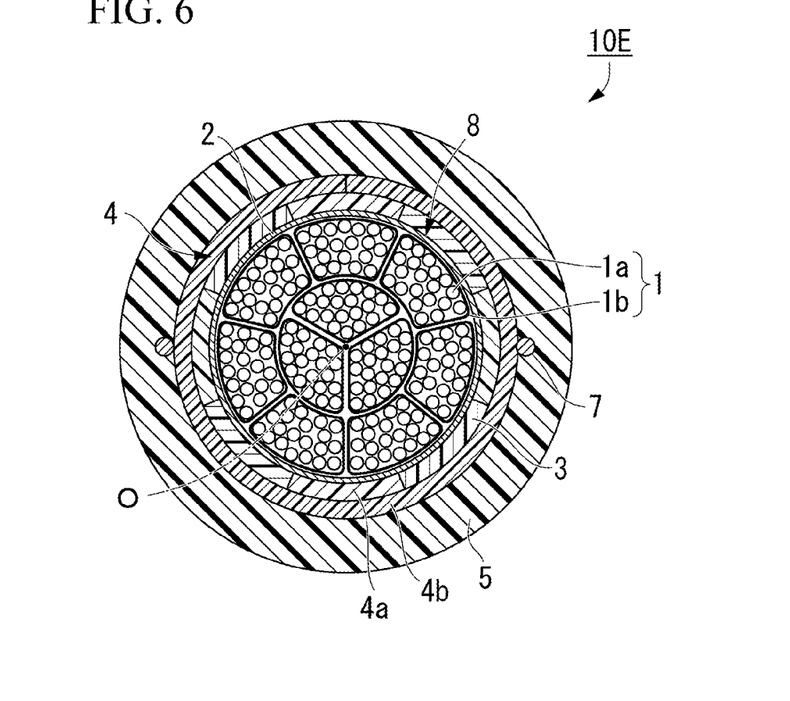
FIG. 6 is a transverse cross-sectional view showing the structure of an optical fiber cable according to one or more embodiments.

For example, although the interposed layer 4 in the above-described embodiments has a single-layer structure, the interposed layer 4 may have a multi-layer structure as shown in FIG. 6. The multi-layer structure is a structure including a first layer element 4a formed from the sheet material 3 that is in contact with the core 8 and a second layer element 4b formed from the sheet material 3 located radially outside the first layer element 4a. As described above, by adopting a configuration in which the sheet materials 3 are double overlapped in the radial direction, the optical fiber 1a can be more reliably protected from external force.

The sheet material 3 included in the first layer element 4a and the sheet material 3 included in the second layer element 4b may include different types of fibers 3a. In this case, compared to the case where the same type of fiber 3a is used for the first layer element 4a and the second layer element 4b, the disadvantage of each fiber 3a can be compensated for while making use of the advantage of each fiber 3a.

Further, one of the first layer element 4a or the second layer element 4b may be a single sheet material 3 which is wound around the core 8 into a cylindrical shape. In the example of FIG. 6, the first layer element 4a is configured by a plurality of sheet materials 3, and the second layer element 4b is configured by one cylindrical sheet material 3. When one sheet material 3 is formed in a cylindrical shape, the sheet material 3 may be spirally wound around the core 8. Alternatively, the sheet material 3 may be simply wrapped from the outside of the core 8 in the radial direction such that the sheet material 3 has a C-shape with an opening closed. In these cases, in addition to the layer element having the plurality of sheet materials 3, the core 8 is further wrapped by one cylindrical sheet material without any gaps, so that the optical fiber 1a can be more reliably protected from external force.

Further, in the above-described embodiments, the plurality of sheet materials 3 extend linearly along the longitudinal direction, but without being limited thereto, the plurality of sheet materials 3 may be wound around the core 8 spirally or in an SZ shape along the longitudinal direction.

In a case where the sheet material 3 extends linearly, when the optical fiber cables 10A to 10D are bent, elongation strain is concentrated on a specific sheet material 3 located outside the bend. On the other hand, in a case where the sheet material 3 is spirally wound, when the optical fiber cables 10A to 10D are bent, compressive strain is applied inside the bend and elongation strain is applied outside the bend, to each sheet material 3. Due to this difference, the maximum value of the elongation strain applied to each sheet material 3 is smaller when the sheet material 3 is spirally wound than when the sheet material 3 extends linearly. As a result, by spirally winding the sheet material 3, the optical fiber cables 10A to 10D can be easily bent.

On the other hand, in a case where the sheet material 3 is wound spirally, the core 8 may be tightened by the sheet material 3 when the optical fiber cables 10A to 10D are pulled in the longitudinal direction. On the other hand, in a case where the sheet material 3 is wound in an SZ shape, tightening of the core 8 by the sheet material 3 can be suppressed.

However, when the sheet material 3 extends linearly, it is considered that the optical fiber cables 10A to 10D can be easily manufactured than when the sheet material 3 is wound spirally or in an SZ shape.

Whether to make the sheet material 3 linear, wound spirally or wound in an SZ shape may be appropriately selected according to the performance required for the optical fiber cables 10A to 10D.

Further, the ripcord 7 may be formed of a fiber reinforced plastic, which is the same material as the sheet material 3, in a rod shape.

Further, the sheet material 3 may be used as a ripcord for tearing the sheath 5 along the longitudinal direction. Since the sheet material 3 has a high tensile strength and does not break unintentionally when pulled, the sheath 5 can be reliably torn. When the sheet material 3 is used as a ripcord, the optical fiber cable may not include the ripcord 7.

In addition, the optical fiber cable of the above-described embodiments may not have a configuration such as a holding binder for fixing the arrangement of the plurality of sheet materials 3. Therefore, it can be manufactured more easily than an optical fiber cable in the related art.

Figure 7:
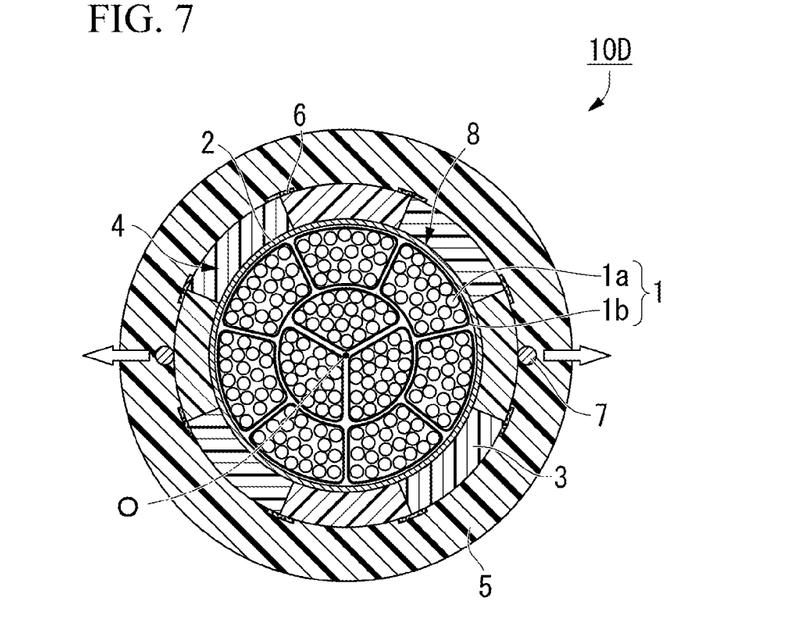
FIG. 7 is a transverse cross-sectional view showing the structure of an optical fiber cable according to one or more embodiments.

Further, in the optical fiber cable 10D (FIG. 5A) of one or more embodiments, the adhesive 6 covers the entire outer peripheral surface of the interposed layer 4. However, as shown in FIG. 7, the adhesive 6 may be provided intermittently in the circumferential direction on the outer peripheral surface of the interposed layer 4 so as to cover the boundary between the sheet materials 3, for example. In this case, the adhesive 6 may be applied intermittently in the circumferential direction to the outer peripheral surface of the interposed layer 4 so as to cover only the boundary portion between the sheet materials 3, and the adhesive 6 may be cured. Alternatively, the matrix 3b itself may be used as the adhesive 6 by heating only the boundary portion between the sheet materials 3 to melt the matrix 3b in that portion and curing the matrix 3b again.

In addition, without departing from the spirit of the present invention, it is possible to appropriately replace the constituent elements in the above-described embodiment with well-known constituent elements, and the above-described embodiment and modification examples may be appropriately combined.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST 10A, 10B, 10C, 10D Optical fiber cable
1a Optical fiber
3 sheet material
3a fiber
3b matrix
4 interposed layer
4a first layer element
4b second layer element
5 sheath
7 ripcord
8 core

What is claimed is:

1. An optical fiber cable comprising:
a core that includes optical fibers;
a sheath that accommodates the core;
an interposed layer disposed between the core and the sheath; and
a ripcord disposed between the interposed layer and the sheath, wherein
the interposed layer includes sheet materials arranged in a circumferential direction of the optical fiber cable to cover the core,
each of the sheet materials includes fibers solidified by a matrix,
the ripcord is disposed radially outside the sheet material, and at least a part of the ripcord is embedded in the sheath, and
the sheet materials extend linearly along a longitudinal direction of the optical fiber cable and are disposed parallel to the core.

2. The optical fiber cable according to claim 1, wherein the interposed layer has a single-layer structure, and
each of the sheet materials is at least partially in contact with the core.

3. The optical fiber cable according to claim 1, wherein in at least a part of adjacent ones of the sheet materials, end parts of the adjacent sheet materials in the circumferential direction abut each other.

4. The optical fiber cable according to claim 1, wherein the interposed layer has a multi-layer structure including at least a first layer element and a second layer element that are formed from the sheet materials,
the first layer element is in contact with the core, and
the second layer element is disposed outside the first layer element.

5. The optical fiber cable according to claim 4, wherein the first layer element and the second layer element include different types of fibers.

6. The optical fiber cable according to claim 1, wherein the ripcord is fixed to at least one of the sheet materials.

7. The optical fiber cable according to claim 1, wherein the sheet materials are fixed to the sheath by permeating a part of the sheet materials with a constituent material of the sheath.

8. The optical fiber cable according to claim 1, wherein the sheet materials are fixed to each other.

9. The optical fiber cable according to claim 1, wherein adjacent ones of the sheet materials in the circumferential direction are in contact with each other, such that the core is covered with the sheet materials without gaps, and
the sheet materials are disposed over an entire circumference of the core in cross-sectional view.

10. An optical fiber cable comprising:
a core that includes optical fibers;
a sheath that accommodates the core;
an interposed layer disposed between the core and the sheath; and
a ripcord disposed between the interposed layer and the sheath, wherein
the interposed layer includes sheet materials arranged in a circumferential direction of the optical fiber cable to cover the core,
each of the sheet materials includes fibers solidified by a matrix,
the ripcord is disposed radially outside the sheet material, and at least a part of the ripcord is embedded in the sheath,
the core does not include a wrapping tube that wraps the optical fibers, and
the interposed layer is in contact with the optical fibers.

11. An optical fiber cable comprising:
a core that includes optical fibers;
a sheath that accommodates the core;
an interposed layer disposed between the core and the sheath; and
a ripcord disposed between the interposed layer and the sheath, wherein
the interposed layer includes sheet materials arranged in a circumferential direction of the optical fiber cable to cover the core,
each of the sheet materials includes fibers solidified by a matrix,
the ripcord is disposed radially outside the sheet material, and at least a part of the ripcord is embedded in the sheath, and
the sheet materials extend linearly along a longitudinal direction of the optical fiber cable over an entire length of the optical fiber cable.

12. The optical fiber cable according to claim 11, wherein the interposed layer has a single-layer structure, and
each of the sheet materials is at least partially in contact with the core.

13. The optical fiber cable according to claim 11, wherein in at least a part of adjacent ones of the sheet materials, end parts of the adjacent sheet materials in the circumferential direction abut each other.

14. The optical fiber cable according to claim 11, wherein the interposed layer has a multi-layer structure including at least a first layer element and a second layer element that are formed from the sheet materials,
the first layer element is in contact with the core, and
the second layer element is disposed outside the first layer element.

15. The optical fiber cable according to claim 14, wherein the first layer element and the second layer element include different types of fibers.

16. The optical fiber cable according to claim 11, wherein the ripcord is fixed to at least one of the sheet materials.

17. The optical fiber cable according to claim 11, wherein the sheet materials are fixed to the sheath by permeating
   a part of the sheet materials with a constituent material of the sheath.

18. The optical fiber cable according to claim 11, wherein the sheet materials are fixed to each other.

19. The optical fiber cable according to claim 11, wherein adjacent ones of the sheet materials in the circumferential
   direction are in contact with each other, such that the core is covered with the sheet materials without gaps, and the sheet materials are disposed over an entire circumference of the core in cross-sectional view.

20. The optical fiber cable according to claim 11, wherein the core does not include a wrapping tube that wraps the
   optical fibers, and the interposed layer is in contact with the optical fibers.

* * * * *